United States Patent
Dodge

(10) Patent No.: US 10,875,395 B2
(45) Date of Patent: Dec. 29, 2020

(54) DOOR ASSEMBLIES INCLUDING VENTED WEATHER STRIPS AND VEHICLES INCORPORATING THE SAME

(71) Applicant: Toyota Motor Engineering & Manufacturing North America, Inc., Plano, TX (US)

(72) Inventor: Brendan R. Dodge, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 25 days.

(21) Appl. No.: 16/239,867

(22) Filed: Jan. 4, 2019

(65) Prior Publication Data

US 2020/0215892 A1     Jul. 9, 2020

(51) Int. Cl.
| | |
|---|---|
| *B60J 1/08* | (2006.01) |
| *B60J 1/17* | (2006.01) |
| *B60J 5/04* | (2006.01) |
| *B60J 10/76* | (2016.01) |
| *B60J 1/20* | (2006.01) |

(52) U.S. Cl.
CPC ............ *B60J 10/76* (2016.02); *B60J 1/08* (2013.01); *B60J 1/17* (2013.01); *B60J 1/20* (2013.01); *B60J 5/0402* (2013.01)

(58) Field of Classification Search
CPC ..... B60J 1/17; B60J 1/20; B60J 5/0402; B60J 10/76; B60J 1/08; B60J 1/10; B60J 1/12; B60H 1/267

USPC ...... 296/146.2, 152; 49/490.1; 454/131–133, 454/137
See application file for complete search history.

(56) References Cited

U.S. PATENT DOCUMENTS

| | | | | |
|---|---|---|---|---|
| 2,040,306 | A * | 5/1936 | Hamm | B60H 1/267 454/133 |
| 2,127,971 | A * | 8/1938 | Graebner | B60J 1/14 454/133 |
| 2,859,680 | A * | 11/1958 | O'Shei | B60J 1/20 454/133 |
| 2,919,638 | A * | 1/1960 | Mathews | B60H 1/267 454/133 |

(Continued)

FOREIGN PATENT DOCUMENTS

| | | |
|---|---|---|
| KR | 20000008963 A | 2/2000 |
| WO | 200108913 A1 | 2/2001 |

*Primary Examiner* — Gregory A Blankenship
(74) *Attorney, Agent, or Firm* — Dinsmore & Shohl LLP

(57) ABSTRACT

A door assembly includes a door frame, a weather strip, and a window glass. The door frame defining a window opening. The weather strip is coupled to the door frame along a portion of the window opening. The weather strip includes an inner flange, an outer flange, and a base that defines a cavity. The inner flange includes a plurality of inner apertures and the outer flange includes a plurality of outer apertures. The window glass is movably coupled to the door frame between a closed position and a vent position. In the closed position the window glass is engaged within the cavity between the plurality of inner apertures and the plurality of outer apertures to inhibit ventilation of air through the weather strip. In the vent position an upper edge of the window glass is engaged within the cavity to permit ventilation of air through the weather strip.

14 Claims, 3 Drawing Sheets

(56) References Cited

U.S. PATENT DOCUMENTS

| | | | | |
|---|---|---|---|---|
| 3,434,408 | A * | 3/1969 | Rivers | B60H 1/267 454/132 |
| 3,866,524 | A | 2/1975 | Forbes, Jr. | |
| 4,756,242 | A * | 7/1988 | Keith | B60H 1/267 296/152 |
| 5,038,521 | A * | 8/1991 | Andrzejewski | B60J 10/248 428/122 |
| 5,251,953 | A * | 10/1993 | Willey | B60J 1/2002 296/152 |
| 5,746,471 | A * | 5/1998 | Teramoto | B29C 70/72 296/146.1 |
| 5,768,826 | A * | 6/1998 | Wilcher | B60J 1/17 49/31 |
| 6,042,473 | A * | 3/2000 | McClary | B60H 1/267 296/152 |
| 6,350,195 | B1 * | 2/2002 | Iino | B60J 1/20 296/152 |
| 6,366,040 | B1 | 4/2002 | McLennan et al. | |
| 7,268,506 | B2 | 9/2007 | Nakagawa et al. | |
| 8,360,500 | B2 * | 1/2013 | Mishimagi | B60J 1/20 296/146.1 |
| 8,827,027 | B2 | 9/2014 | Syvret et al. | |
| 10,449,831 | B2 * | 10/2019 | Co | B60H 1/267 |
| 2006/0021281 | A1 * | 2/2006 | Tamaoki | B60J 10/265 49/441 |
| 2007/0278821 | A1 * | 12/2007 | Peterson | B60J 1/2002 296/152 |
| 2015/0306938 | A1 * | 10/2015 | Stauffer | B60J 10/242 454/163 |
| 2015/0367707 | A1 * | 12/2015 | Co | B60H 1/265 454/164 |
| 2015/0367709 | A1 * | 12/2015 | Co | B60H 1/265 454/133 |
| 2016/0221420 | A1 * | 8/2016 | Bloss | B60J 1/12 |
| 2018/0126950 | A1 * | 5/2018 | Alderman | H04L 67/30 |
| 2018/0361954 | A1 * | 12/2018 | Renke | E05F 15/695 |
| 2019/0143390 | A1 * | 5/2019 | Yamamoto | B60J 5/0469 403/285 |
| 2019/0375277 | A1 * | 12/2019 | Onitsuka | B60J 1/17 |

* cited by examiner

DOOR ASSEMBLIES INCLUDING VENTED WEATHER STRIPS AND VEHICLES INCORPORATING THE SAME

TECHNICAL FIELD

The present specification generally relates to door assemblies for a vehicle, and more particularly, door assemblies including a vented weather strip that permits window venting.

BACKGROUND

It has been known to provide vehicles with door assemblies having window glasses that are movable between a closed position, an open position, and a plurality of intermediate positions between the closed position and the open position. The previously known vehicles are also provided with a weather strip that receives an upper edge of a window glass to provide a seal between the window glass and the weather strip. The seal prevents the ventilation of air between the passenger compartment and an exterior atmosphere.

The previously known door assemblies fail to provide for the remote operation of the window glass to ventilate the passenger compartment of the vehicle. Specifically, when the window glass is lowered to disengage from the weather strip there is a gap provided between the weather strip and the upper edge of the window glass in which objects may become stuck upon raising of the window glass.

Accordingly, there is a need for a door assembly of a vehicle, that includes a window glass movable between a closed position and a vent position in which an upper edge of the window glass is engaged within a cavity of a weather strip to permit ventilation of air through a plurality of inner apertures and a plurality of outer apertures formed in the weather strip.

SUMMARY

In one embodiment, a door assembly, of a vehicle, includes a door frame, a weather strip, and a window glass. The door frame at least partially defining a window opening. The weather strip is coupled to the door frame along a portion of the window opening. The weather strip includes an inner flange, an outer flange, and a base that defines a cavity. The inner flange includes a plurality of inner apertures and the outer flange includes a plurality of outer apertures. The window glass is movably coupled to the door frame between a closed position and a vent position. In the closed position the window glass is engaged within the cavity between the plurality of inner apertures and the plurality of outer apertures to inhibit ventilation of air through the weather strip between the plurality of inner apertures and the plurality of outer apertures. In the vent position an upper edge of the window glass is engaged within the cavity to permit ventilation of air through the weather strip between the plurality of inner apertures and the plurality of outer apertures.

In another embodiment, a vehicle includes a door frame, a weather strip, and a window glass. The door frame at least partially defining a window opening. The weather strip is coupled to the door frame along a portion of the window opening. The weather strip includes an inner flange, an outer flange, and a base that defines a cavity. The inner flange includes a plurality of inner apertures and the outer flange includes a plurality of outer apertures. The window glass is movably coupled to the door frame between a closed position and a vent position. In the closed position the window glass is engaged within the cavity between the plurality of inner apertures and the plurality of outer apertures to inhibit ventilation of air through the weather strip between the plurality of inner apertures and the plurality of outer apertures. In the vent position an upper edge of the window glass is engaged within the cavity to permit ventilation of air through the weather strip between the plurality of inner apertures and the plurality of outer apertures.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
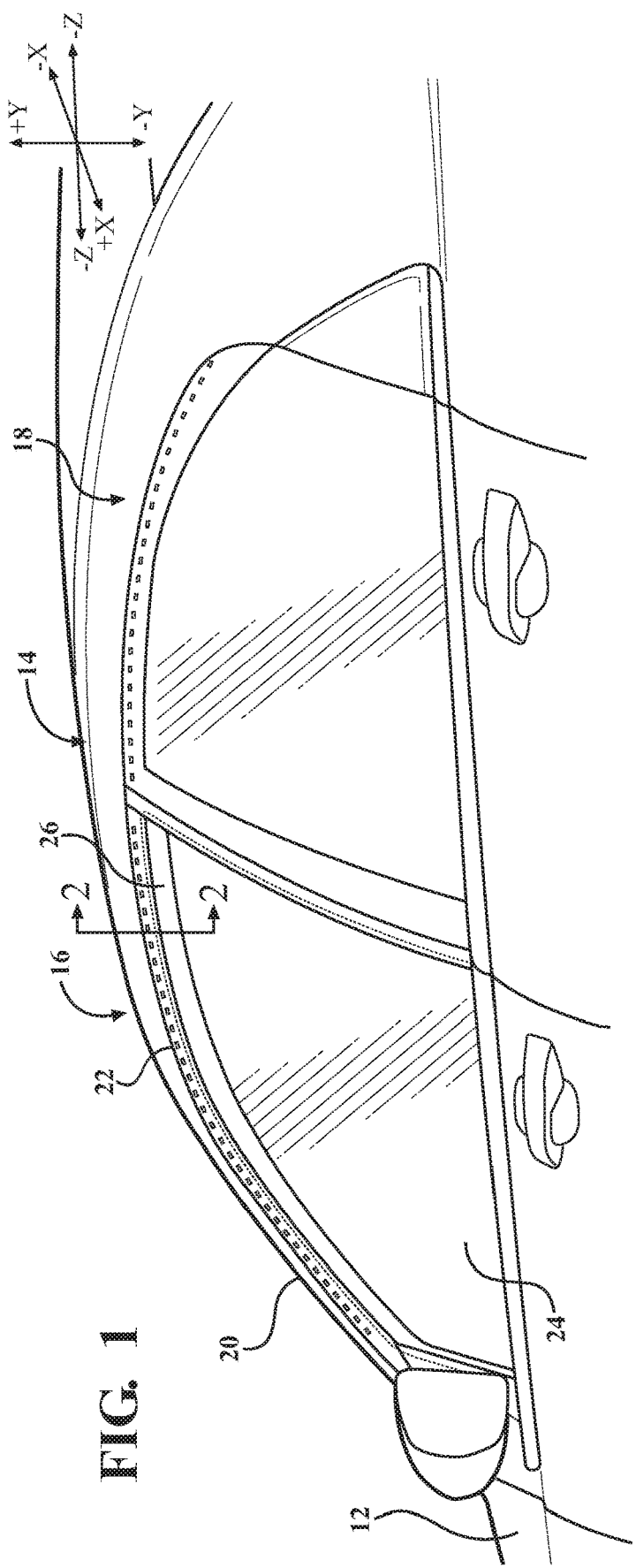
FIG. 1 schematically depicts a partial perspective view of a vehicle including a door assembly having a window glass in an open position according to one or more embodiments shown or described herein.
Figure 1:
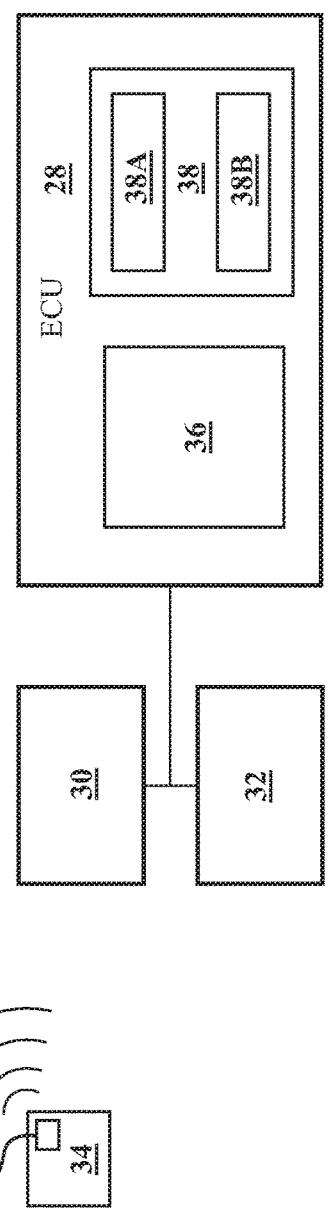

Vehicles according to the present specification include door assemblies that include a door frame, a weather strip, and a window glass. The door frame at least partially defining a window opening. The weather strip is coupled to the door frame along a portion of the window opening. The weather strip includes an inner flange, an outer flange, and a base that defines a cavity. The inner flange includes a plurality of inner apertures and the outer flange includes a plurality of outer apertures. The window glass is movably coupled to the door frame between a closed position and a vent position. In the closed position the window glass is engaged within the cavity between the plurality of inner apertures and the plurality of outer apertures to inhibit ventilation of air through the weather strip between the plurality of inner apertures and the plurality of outer apertures. In the vent position an upper edge of the window glass is engaged within the cavity to permit ventilation of air through the weather strip between the plurality of inner apertures and the plurality of outer apertures. As such, the door assemblies of the present specification allow for the ventilation of air between a passenger compartment of the vehicle and an exterior atmosphere without creating a gap between an upper edge of the window glass and the weather strip, specifically lower edges thereof, in which objects may be inserted.

Vehicles according to the present specification also permit for the remote operation of the window glass between a closed position and a vent position. As the upper edge of the window glass does not create a gap with lower edges of the weather strip in the vent position, the window glass is configured to be remotely operated to move between the vent position and the closed position without creating a gap in which objects may be inserted.

Various embodiments of door assemblies are described in detail below with reference to the appended drawings.

As used herein, the term "vehicle longitudinal direction" refers to the forward-rearward direction of the vehicle (i.e., in the +/− vehicle Z-direction as depicted). The term "vehicle lateral direction" refers to the cross-vehicle direction of the vehicle (i.e., in the +/− vehicle X-direction as depicted), and is transverse to the vehicle longitudinal direction. The term "vehicle vertical direction" refers to the upward-downward direction of the vehicle (i.e., in the +/− vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring to FIG. 1, a vehicle 10 is depicted. The vehicle 10 includes a body 12. The vehicle 10 also includes a cabin that is integral with the body 12. The cabin generally defines a passenger compartment 14 of the vehicle 10. The vehicle 10 includes one or more door assemblies coupled to the body 12 of the vehicle 10.

A front door assembly 16 is coupled to an A-pillar and a rear door assembly 18 is coupled to a B-pillar. In some embodiments, the front door assembly 16 is hingedly coupled to the A-pillar and the rear door assembly 18 is hingedly coupled to the B-pillar. In other embodiments, the rear door assembly 18 may be severally coupled to the B-pillar, such as when the rear door assembly 18 is sliding door or when the rear door assembly 18 is hingedly coupled to the C-pillar (i.e., a rear-hinged door). The front door assembly 16 and the rear door assembly 18 facilitate ingress and egress to the passenger compartment 14 of the vehicle 10.

The front door assembly 16 includes a door frame 20, a weather strip 22, and a window glass 24. As the rear door assembly 18 is provided with corresponding structure of the front door assembly 16, discussion of the structure of the rear door assembly 18 will be omitted.

The door frame 20 at least partially defines a window opening 26. The window opening 26 permits access between the passenger compartment 14 and an exterior of the vehicle 10. As will be described in greater detail below, the weather strip 22 is coupled to door frame 20 along a portion of the window opening 26. The window glass 24 is movably coupled to the door frame 20 between a closed position, a vent position, and an open position.

In some embodiments, the vehicle 10 includes an electronic control unit 28, an actuator 30, a receiver 32, and a mobile computing device 34. The electronic control unit 28 includes a processor 36 and a memory unit 38 coupled to the processor 36. The processor 36 includes processing components operable to receive and execute instructions from the memory unit 38. The memory unit 38 stores detection logic 38A and control logic 38B. The detection logic 38A and the control logic 38B may each include a plurality of different pieces of logic, each of which may be embodied as a computer program, firmware, and/or software/hardware.

In some embodiments, the memory unit 38 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the electronic control unit 28 and/or external to the electronic control unit 28.

The actuator 30 is operatively connected to the electronic control unit 28. The actuator 30 is operatively connected to the window glass 24 to move the window glass 24 between the closed position, the open position, and the vent position. In some embodiments, the actuator 30 is a mechanical, electrical, or electromechanical motor connected to the window glass 24.

The receiver 32 is operatively connected to the electronic control unit 28. The receiver 32 is configured to receive a signal transmitted from the mobile computing device 34. The mobile computing device 34 may be configured as a mobile phone, tablet, personal computer, key fob, and/or any other devices for performing the functionality described herein. As described in greater detail below, the mobile computing device 34 includes at least one input 34A upon actuation thereof transmits a signal that is received by the receiver 32.

Figure 2B:
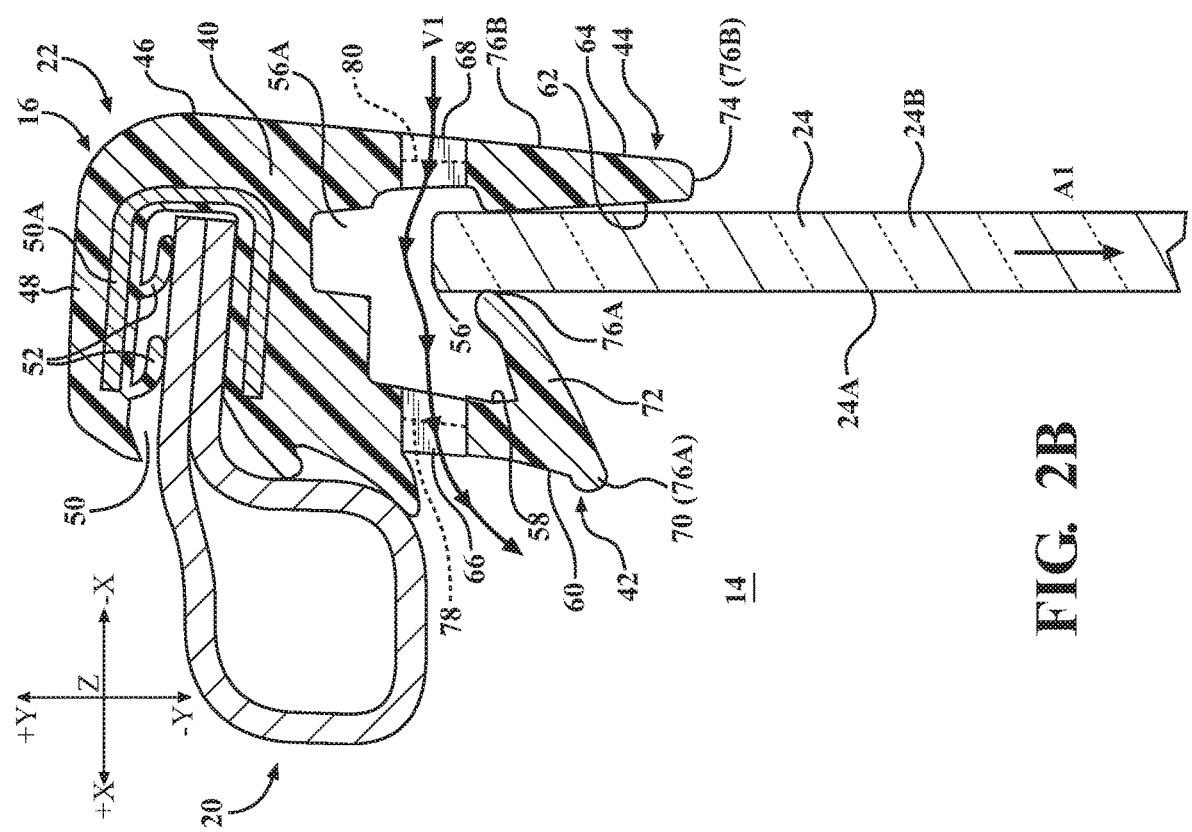
FIG. 2B schematically depicts a partial cross-sectional side view of the door assembly taken along the line 2-2 of FIG. 1, in which the window glass is in a vent position, according to one or more embodiments shown or described herein.
Figure 2A:
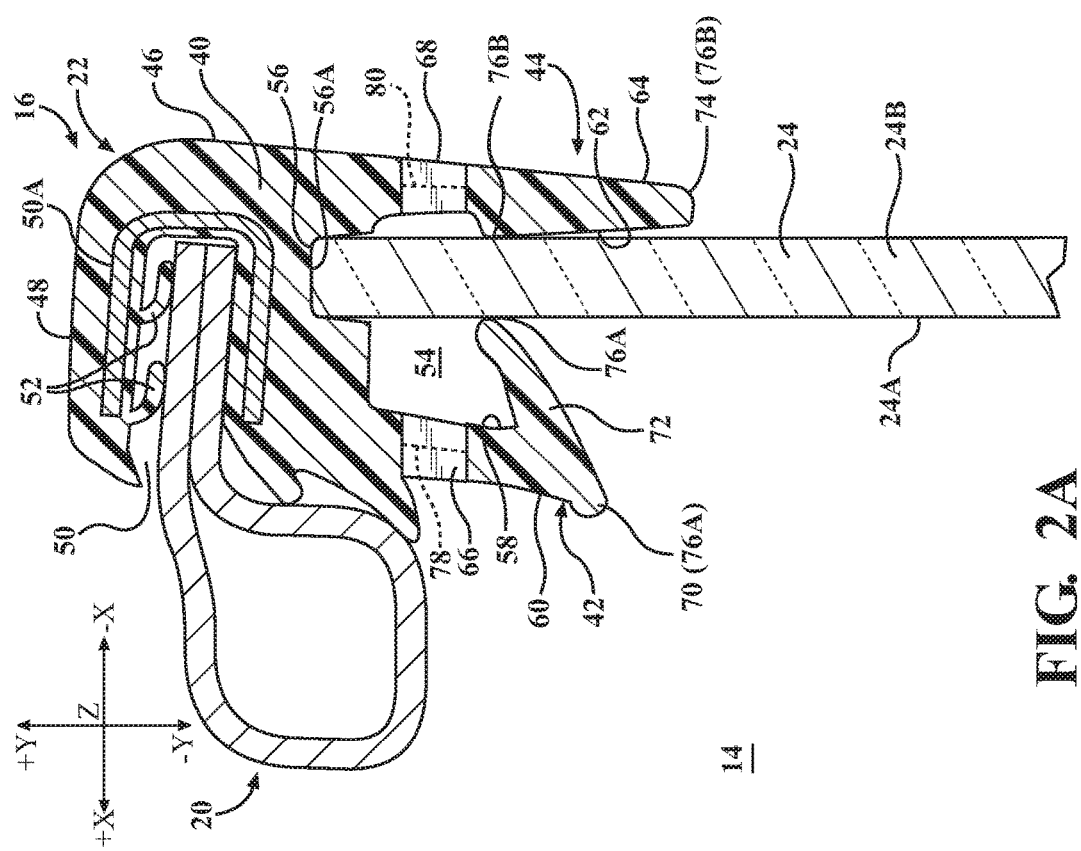
FIG. 2A schematically depicts a partial cross-sectional side view of the door assembly taken along the line 2-2 of FIG. 1, in which the window glass is in a closed position, according to one or more embodiments shown or described herein.
Figure 3:
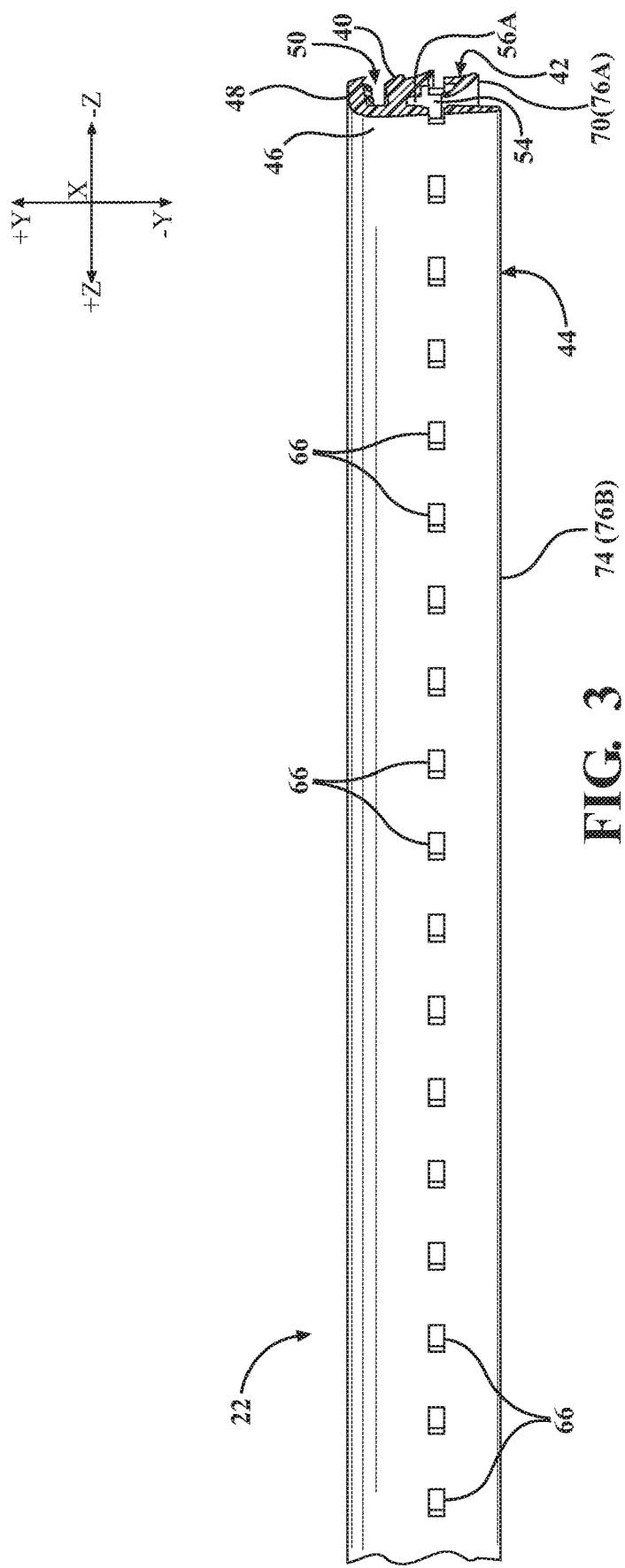
FIG. 3 schematically depicts a partial side view of a weather strip of the door assembly of FIG. 1.

Referring to FIG. 2A, the door frame 20 provides structural support for the front door assembly 16. The door frame 20 may extend continuously around and at least partially define the window opening 26. The window glass 24 that is at least partially received within the window opening 26. The window glass 24 may be operable to move between the open position, as shown in FIG. 1, the closed position, as shown in FIG. 2A, and the vent position, as shown in FIG. 2B.

Referring to FIG. 2A, the weather strip 22 is provided to create at least a partial seal around the window glass 24. The weather strip 22 includes a base 40, an inner flange 42, an outer flange 44, an exterior extension 46, and a door frame flange 48. The base 40, the exterior extension 46, and the door frame flange 48 defines a door frame cavity 50 that at least partially receives a portion of the door frame 20 that bounds at least a portion of the window opening 26. In some embodiments, the weather strip 22 is provided with a generally C-shaped reinforcement member 50A embedded within the base 40, the exterior extension 46, and the door frame flange 48. In some embodiments, the weather strip also includes a plurality of sealing fingers 52 that extend downwardly from the door frame flange 48 to secure the door frame 20 within the door frame cavity 50.

The base 40, the inner flange 42, and the outer flange 44 define a window glass cavity 54 which receives an upper edge 56 of the window glass 24. The inner flange 42 and the outer flange 44 extend downwardly from the base 40 in the vehicle vertical direction. The inner flange 42 is positioned inboard of the outer flange 44 in the vehicle lateral direction. The outer flange 44 is positioned outboard of the inner flange 42 in the vehicle lateral direction. The inner flange 42 is positioned between the window glass 24 and the passenger compartment 14 of the vehicle 10, and the outer flange 44 is positioned between the window glass 24 and an exterior of the vehicle 10. In some embodiments, the outer flange 44 forms a portion of the exterior of the vehicle 10.

The inner flange 42 includes an interior surface 58 and an opposite exterior surface 60. The outer flange 44 includes an inner surface 62 and an outer surface 64. The interior surface 58 of the inner flange 42 faces the inner surface 62 of the outer flange 44. The interior surface 58 of the inner flange 42 and the inner surface 62 of the outer flange 44 define a portion of the window glass cavity. The exterior surface 60 of the inner flange 42 faces the passenger compartment 14 of the vehicle 10, and the outer surface 64 of the outer flange 44 faces an exterior of the vehicle.

The inner flange 42 includes a plurality of inner apertures 66 that extend between the interior surface 58 and the exterior surface 60 of the inner flange 42. The plurality of inner apertures 66 permits a ventilation of air between the passenger compartment 14 of the vehicle 10 and the window glass cavity 54. The outer flange 44 includes a plurality of outer apertures 68 that extend between the outer surface 64 and the inner surface 62 of the outer flange 44. The plurality of outer apertures 68 permits a ventilation of air from atmosphere exterior of the vehicle 10 and the window glass cavity 54.

The inner flange 42 may include lower edge 70, and a sealing finger 72 that extends outwardly from the interior surface 58 into the window glass cavity 54. The outer flange 44 may include a lower edge 74. In some embodiments, a distal end of the sealing finger 72 is formed as an inner contact point 76A between the inner flange 42 and an inner side surface 24A of the window glass 24, and a portion of the inner surface 62 of the outer flange 44 is formed as an outer contact point 76B between the outer flange 44 and an outer side surface 24B of the window glass 24. In some embodiments, the lower edge 70 of the inner flange 42 is formed as the inner contact point 76A between the inner side surface 24A of the window glass 24, and the lower edge 74 of the outer flange 44 is formed as the outer contact point 76B between the outer side surface 24B of the window glass 24.

The plurality of inner apertures 66 are formed in the inner flange 42 between the base 40 and the inner contact point 76A, such that the plurality of inner apertures 66 are formed above the inner contact point 76A in the vehicle vertical direction. The plurality of outer apertures 68 are formed in the outer flange 44 between the base 40 and the outer contact point 76B, such that the plurality of outer apertures 68 are formed above the outer contact point 76B in the vehicle vertical direction. The plurality of inner apertures 66 are formed in the inner flange 42 above the lower edge 70 in the vehicle vertical direction. The plurality of outer apertures 68 are formed in the outer flange 44 above the lower edge 74 in the vehicle vertical direction.

Referring to FIG. 2A, the window glass 24 is in the closed position in which the window glass 24 is engaged within the window glass cavity 54 such that the window glass 24 is positioned between the plurality of inner apertures 66 and the plurality of outer apertures 68 to inhibit ventilation of air through the weather strip 22. Specifically, an upper edge 56 of the window glass 24 is engaged with the base 40 to form a seal to inhibit a ventilation of air from the atmosphere exterior to the vehicle 10 through the plurality of outer apertures 68, the window glass cavity 54, the plurality of inner apertures 66 into the passenger compartment 14.

In some embodiments, the upper edge 56 of the window glass 24 is received within an upper edge cavity 56A formed in the base 40 of the weather strip 22 to form a seal to inhibit the ventilation of air through the weather strip 22.

Referring to FIG. 2B, the window glass 24 is moved from the closed position to the vent position upon movement of the window glass 24 by the actuator 30, in the direction of arrow A1. In the vent position at least the upper edge 56 of the window glass 24 is engaged and/or received within the window glass cavity 54 to permit the ventilation of air V1 through the weather strip between the plurality of outer apertures 68 and the plurality of inner apertures 66.

In the vent position, the window glass 24 is lowered in the direction of arrow A1 such that at least the upper edge 56 of the window glass 24 is received within the window glass cavity 54 so that no gap is formed between the upper edge 56 of the window glass 24 and the weather strip 22. Specifically, in the vent position, the upper edge 56 of the window glass 24 is positioned below the base 40 such that the seal between the upper edge 56 of the window glass 24 and the weather strip 22 is no longer formed. In some embodiments, in the vent position the upper edge 56 of the window glass 24 is positioned above, in the vehicle vertical direction, the inner contact point 76A and the outer contact point 76B such that no gap is formed between the upper edge 56 of the window glass 24 and the weather strip 22. In some embodiments, in the vent position the upper edge 56 of the window glass 24 is positioned above, in the vehicle vertical direction, the lower edge 70 of the inner flange 42 and the lower edge 74 of the outer flange 44 such that that no gap is formed between the upper edge 56 of the window glass 24 and the weather strip 22.

As the seal between the upper edge 56 of the window glass 24 and the weather strip 22 is no longer formed, the ventilation of air V1 is permitted through the weather strip 22. Specifically, the ventilation of air V1 is permitted to ventilate between the passenger compartment 14 through the plurality of inner apertures 66, the window glass cavity 54, the plurality of outer apertures 68 to the atmosphere exterior to the vehicle 10.

Referring to FIG. 1, the window glass 24 is provided in the open position in which the upper edge 56 of the window glass 24 is disengaged and/or removed from the window glass cavity 54 such that a gap is formed between the upper edge 56 of the window glass 24 and the lower edge 70 of the inner flange 42 and the lower edge 74 of the outer flange 44.

Referring to FIGS. 2A and 2B, the plurality of inner apertures 66 are provided with an inner screen 78 and the plurality of outer apertures 68 are provided with an outer screen 80. The inner screen 78 and the outer screen 80 are configured to permit the passage of air there through while preventing the passage of other objects such as debris and/or insects from entering the passenger compartment 14 through the plurality of inner apertures 66 and the plurality of outer apertures 68 when the window glass 24 is in the vent position. In some embodiments, the inner screen 78 and the outer screen 80 are formed as a mesh material that is air permeable.

In some embodiments, the vehicle 10 permits for the remote operation of the window glass 24 to move between the closed position and the vent position. Specifically, the vehicle 10 permits a user located remotely from the vehicle 10 to operate the window glass 24 to move between the closed position and the vent position without being physically located within the vehicle. The user actuates the input 34A on the mobile computing device 34, and the mobile computing device 34 transmits a signal. The receiver 32 receives the signal transmitted from the mobile computing device 34. The detection logic 38A is executable by the processor 36 to detect one or more signals, from the receiver 32, which indicate an operation to move the window glass 24 between the closed position and the vent position.

In response to the detection of a vent signal from the mobile computing device 34 which is received by the receiver 32, the control logic 38B is executable by the processor 36 to control the actuator 30 to move the window glass 24 from the closed position to the vent position by operating the actuator 30 to move the upper edge 56 of the window glass 24 downwardly a predetermined distance. The predetermined distance, which may be set in advance, allows the upper edge 56 of the window glass 24 to remove engaged and/or received within the window glass cavity 54 and to permit the ventilation of air through the weather strip 22 between the plurality of inner apertures 66 and the plurality of outer apertures 68.

In response to the detection of a close signal from the mobile computing device 34 which is received by the receiver 32, the control logic 38B is executable by the processor 36 to control the actuator 30 to move the window glass 24 from the vent position to the closed position by operating the actuator 30 to move the upper edge 56 of the window glass 24 upwardly the predetermined distance such that the upper edge 56 of the window glass 24 forms a seal with the weather strip 22 to inhibit ventilation of air through the weather strip 22 between the plurality of inner apertures 66 and the plurality of outer apertures 68.

In some embodiments, the input 34A is provided within the vehicle 10 such that a user is permitted to lower the window glass 24 the predetermined distance from the closed position to the vent position by operation of a single input. Specifically, the use is permitted to actuate the input 34A, which is detected by the detection logic 38A and the control logic 38B controls the actuator 30 to lower the window glass 24 the predetermined distance.

In some embodiments, the plurality of inner apertures 66 and the plurality of outer apertures 68 are formed having a generally rectangular shape. In some other embodiments, the plurality of inner apertures 66 and the plurality of outer apertures 68 may be formed having a generally circular, oval, elliptical, triangular, elongated slits, or other regular or irregular shape.

In some embodiments, the weather strip 22 is provided around an upper portion and vertical portions of the window opening 26. In some embodiments, the weather strip 22 may be formed from a variety of natural or synthetic materials, illustratively including a thermoplastic elastomer (TPE) such as thermoplastic vulcanisate (TPV). TPV materials may give consistent and predictable performance, extended durability, and light and moisture resistance. In the illustrated embodiments, the weather strip 22 is provided on the front door assembly 16. However, the weather strip 22 is not limited to use with the front door assembly 16 and may be utilized in the rear door assembly 18. In some embodiments, the vehicle 10 is a car. In some other embodiments, the vehicle 10 may be a truck, a sport utility vehicle, a van, a boat, a plane, or other vehicle types.

It should now be understood that the present disclosure includes door assemblies and vehicles including door assemblies. In embodiments, the door assemblies that include a door frame, a weather strip, and a window glass. The door frame at least partially defining a window opening. The weather strip is coupled to the door frame along a portion of the window opening. The weather strip includes an inner flange, an outer flange, and a base that defines a cavity. The inner flange includes a plurality of inner apertures and the outer flange includes a plurality of outer apertures. The window glass is movably coupled to the door frame between a closed position and a vent position. In the closed position the window glass is engaged within the cavity between the plurality of inner apertures and the plurality of outer apertures to inhibit ventilation of air through the weather strip between the plurality of inner apertures and the plurality of outer apertures. In the vent position an upper edge of the window glass is engaged within the cavity to permit ventilation of air through the weather strip between the plurality of inner apertures and the plurality of outer apertures. As such, the door assemblies of the present specification allow for the ventilation of air between a passenger compartment of the vehicle and an exterior atmosphere without creating a gap between an upper edge of the window glass and the weather strip, specifically lower edges thereof, in which objects may be inserted.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door assembly of a vehicle, the door assembly comprising:
   a door frame at least partially defining a window opening;
   a weather strip coupled to the door frame along a portion of the window opening, the weather strip including an inner flange, an outer flange, and a base that defines a cavity, the base is directly coupled to the door frame, the inner flange includes a plurality of inner apertures and the outer flange includes a plurality of outer apertures; and
   a window glass movably coupled to the door frame between a closed position and a vent position, in the closed position the window glass is engaged within the cavity between the plurality of inner apertures and the plurality of outer apertures to inhibit ventilation of air through the weather strip between the plurality of inner apertures and the plurality of outer apertures, and in the vent position an upper edge of the window glass is engaged within the cavity to permit ventilation of air through the weather strip between the plurality of inner apertures and the plurality of outer apertures.

2. The door assembly of claim 1, wherein the window glass is movably coupled to the door frame between the closed position, the vent position, and an open position, in the open position, the upper edge of the window glass is disengaged from the cavity of the weather strip.

3. The door assembly of claim 2, wherein the inner flange and the outer flange extend downwardly from the base in a vehicle vertical direction, and the outer flange is positioned outboard of the inner flange in a vehicle lateral direction.

4. The door assembly of claim 3, wherein the inner flange includes an interior surface and an opposite exterior surface, and the outer flange includes an inner surface and an opposite outer surface, the interior surface of the inner flange faces the inner surface of the outer flange.

5. The door assembly of claim 4, wherein each of the plurality of inner apertures extends between the interior surface and the exterior surface of the inner flange, and each of the plurality of outer apertures extends between the inner surface and the outer surface of the outer flange.

6. The door assembly of claim 1 further comprising:
an actuator operatively connected to the window glass;
a mobile computing device configured to transmit a signal; and
an electronic control unit operatively connected to the actuator, the electronic control unit includes a processor and a memory unit coupled to the processor, the memory unit stores logic that, when executed by the processor, causes the electronic control unit to:
receive the signal from the mobile computing device; and
in response to receiving the signal from the mobile computing device, control the actuator to move the window glass between the closed position and the vent position.

7. The door assembly of claim 6, wherein the mobile computing device is remote from the vehicle.

8. A vehicle comprising:
a door frame at least partially defining a window opening;
a weather strip coupled to the door frame along a portion of the window opening, the weather strip including an inner flange, an outer flange, and a base that defines a cavity, the base is directly coupled to the door frame, the inner flange includes a plurality of inner apertures and the outer flange includes a plurality of outer apertures; and
a window glass movably coupled to the door frame between a closed position and a vent position, in the closed position the window glass is engaged within the cavity between the plurality of inner apertures and the plurality of outer apertures to inhibit ventilation of air through the weather strip between the plurality of inner apertures and the plurality of outer apertures, and in the vent position an upper edge of the window glass is engaged within the cavity to permit ventilation of air through the weather strip between the plurality of inner apertures and the plurality of outer apertures.

9. The vehicle of claim 8, wherein the window glass is movably coupled to the door frame between the closed position, the vent position, and an open position, in the open position, the upper edge of the window glass is disengaged from the cavity of the weather strip.

10. The vehicle of claim 9, wherein the inner flange and the outer flange extend downwardly from the base in a vehicle vertical direction, and the outer flange is positioned outboard of the inner flange in a vehicle lateral direction.

11. The vehicle of claim 10, wherein the inner flange includes an interior surface and an opposite exterior surface, and the outer flange includes an inner surface and an opposite outer surface, the interior surface of the inner flange faces the inner surface of the outer flange.

12. The vehicle of claim 11, wherein each of the plurality of inner apertures extends between the interior surface and the exterior surface of the inner flange, and each of the plurality of outer apertures extends between the inner surface and the outer surface of the outer flange.

13. The vehicle of claim 8 further comprising:
an actuator operatively connected to the window glass;
a mobile computing device configured to transmit a signal; and
an electronic control unit operatively connected to the actuator, the electronic control unit includes a processor and a memory unit coupled to the processor, the memory unit stores logic that, when executed by the processor, causes the electronic control unit to:
receive the signal from the mobile computing device; and
in response to receiving the signal from the mobile computing device, control the actuator to move the window glass between the closed position and the vent position.

14. The vehicle of claim 13, wherein the mobile computing device is remote from the vehicle.

* * * * *